United States Patent
Smith et al.

(10) Patent No.: US 7,522,805 B2
(45) Date of Patent: Apr. 21, 2009

(54) WALL MOUNT DISTRIBUTION ARRANGEMENT

(75) Inventors: Trevor D. Smith, Eden Prairie, MN (US); Thomas LeBlanc, Fitchburg, MA (US); Oscar Fernando Bran de Leon, Belle Plaine, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 11/716,393

(22) Filed: Mar. 9, 2007

(65) Prior Publication Data

US 2008/0219633 A1 Sep. 11, 2008

(51) Int. Cl.
*G02B 6/04* (2006.01)
(52) U.S. Cl. ...................................... 385/135
(58) Field of Classification Search .................. 385/135
See application file for complete search history.

(56) References Cited

U.S. PATENT DOCUMENTS

| 6,160,946 | A | 12/2000 | Thompson et al. | |
|---|---|---|---|---|
| 6,760,531 | B1 | 7/2004 | Solheid et al. | |
| 6,788,786 | B1 | 9/2004 | Kessler et al. | |
| 7,142,764 | B2 | 11/2006 | Allen et al. | |
| 2006/0008231 | A1* | 1/2006 | Reagan et al. | 385/135 |
| 2006/0269206 | A1 | 11/2006 | Zimmel | |
| 2007/0189691 | A1 | 8/2007 | Barth et al. | |
| 2007/0189692 | A1 | 8/2007 | Zimmel et al. | |
| 2007/0192817 | A1 | 8/2007 | Landry et al. | |
| 2008/0031585 | A1 | 2/2008 | Solheid et al. | |
| 2008/0079341 | A1 | 4/2008 | Anderson et al. | |

FOREIGN PATENT DOCUMENTS

| DE | 91 05 800.7 | 6/1991 |
|---|---|---|
| DE | 9105800 | 6/1991 |

OTHER PUBLICATIONS

ADC Telecommunications, Inc.; Assembly Drawing; Jul. 26, 2006; 4 pgs.
Zimmel et al., U.S. Appl. No. 11/354,297, filed Feb. 13, 2006; Fiber Optic Splitter Module.
Anderson, et al., U.S. Appl. No. 60/848,902, filed Oct. 2, 2006, Fiber Distribution Hub With Dual Swing Frames.
Landry et al., U.S. Appl. No. 11/544,951, filed Oct. 6, 2006, Fiber Distribution Hub With Outside Accessible Grounding Terminals.
Solheid et al., U.S. Appl. No. 11/743,941, filed May 3, 2007, Fiber Distribution Hub With Swing Frame and Wrap-Around Doors.
"Zubehör für LWL-Kabelnetze," *Corning Cable Systems*, 13 pages (Copyright 2002).
ADC FONS Outdoor Distribution Enclosure (ODE-13) Installation Instructions; Issue 1; dated Jun. 2006; 20 pgs.

* cited by examiner

*Primary Examiner*—Sarah Song
(74) *Attorney, Agent, or Firm*—Merchant & Gould P.C.

(57) ABSTRACT

A wall-mount distribution arrangement including a termination arrangement, a splicing arrangement, and a splitter arrangement. Each of the termination, splicing, and splitter arrangements being located within an interior of a wall-mount enclosure of the distribution arrangement. The arrangement further including a pivoting panel located within the interior of the wall-mount enclosure. The termination arrangement being mounted to a first side of the panel, one of the other of the splicing arrangement and the splitter arrangement being mounted to a second side of the panel.

20 Claims, 10 Drawing Sheets

WALL MOUNT DISTRIBUTION ARRANGEMENT

TECHNICAL FIELD

This disclosure relates to devices for use in the telecommunications industry, and associated methods. More specifically, this disclosure relates to a fiber optic distribution arrangement for use in multi-dwelling applications.

BACKGROUND

Demand for fiber optic services is continuously increasing. In accommodating the need of current and future customers, fiber optic distribution cables are routed from a central office to extended areas. Providing fiber optic services to customers in some applications, such as to customers in a multiple dwelling unit, for example, involves splitting a fiber optic distribution cable into individual cables that are associated with a particular dwelling of the multiple dwelling unit.

In conventional arrangements, the distribution cable is routed from the central office to a large fiber distribution hub. The distribution cable is split out into a number of individual fiber optic cables at the fiber distribution hub. The individual fiber optic cables are then each routed to a wall-mount box located at the multiple dwelling unit. The large fiber distribution hub is located remote from the wall-mount box. Typically, the fiber distribution hub splits-out a number of multi-fiber distribution cables and feeds a number of wall-mount boxes.

In general, improvement of such multi-dwelling wall-mount boxes is needed; generally to more efficiently provide a multi-functional interface at the location of the multiple dwelling unit.

SUMMARY

One aspect of the present disclosure relates to a wall-mount distribution arrangement that provides at least three interface functions: including distribution cable splicing, distribution cable splitting, and multi-dwelling outgoing cable termination. Another aspect of the present disclosure relates to a wall-mount distribution enclosure including a pivoting panel having a termination arrangement mounted on a first side and a splitter arrangement mounted on a second side. Yet still another aspect of the present disclosure relates to a hinge arrangement of the wall-mount distribution enclosure. The hinge arrangement includes first and second hinges the permit an interior panel and an exterior cover to pivot relative to a housing of the wall-mount enclosure.

A variety of examples of desirable product features or methods are set forth in part in the description that follows, and in part will be apparent from the description, or may be learned by practicing various aspects of the disclosure. The aspects of the disclosure may relate to individual features as well as combinations of features. It is to be understood that both the foregoing general description and the following detailed description are explanatory only, and are not restrictive of the claimed invention.

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

Figure 1:
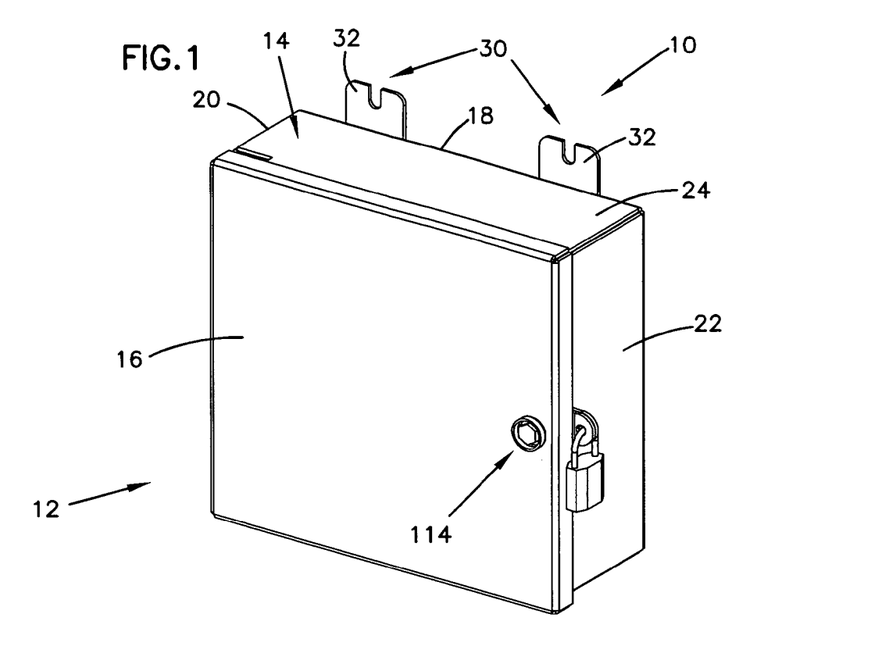
FIG. 1 is a front perspective view of one embodiment of a wall-mount distribution arrangement, in accordance with the principles disclosed.
Figure 2:
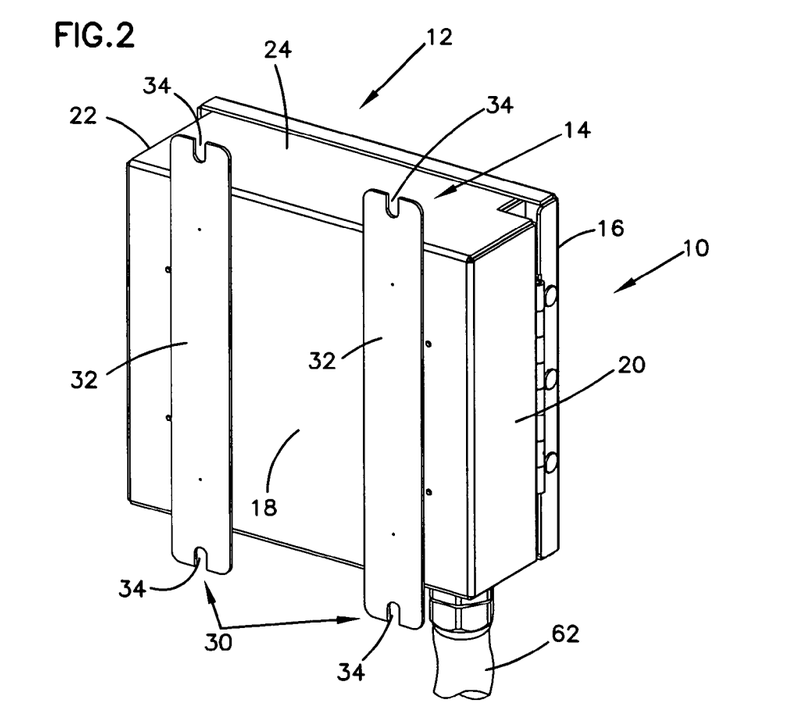
FIG. 2 is a rear perspective view of the wall-mount distribution arrangement of FIG. 1.

FIG. 1 illustrates one embodiment of a wall mount telecommunications distribution arrangement 10 (e.g., wall mount box) in accordance with the principles disclosed. The wall-mount distribution arrangement 10 is designed for use in applications requiring an interface between an incoming fiber cable and a plurality of outgoing fiber cables. A multi-dwelling unit is one application in which the present arrangement 10 can be used, although, the disclosed distribution arrangement can be used in other applications that require such interface as well.

Figure 3:
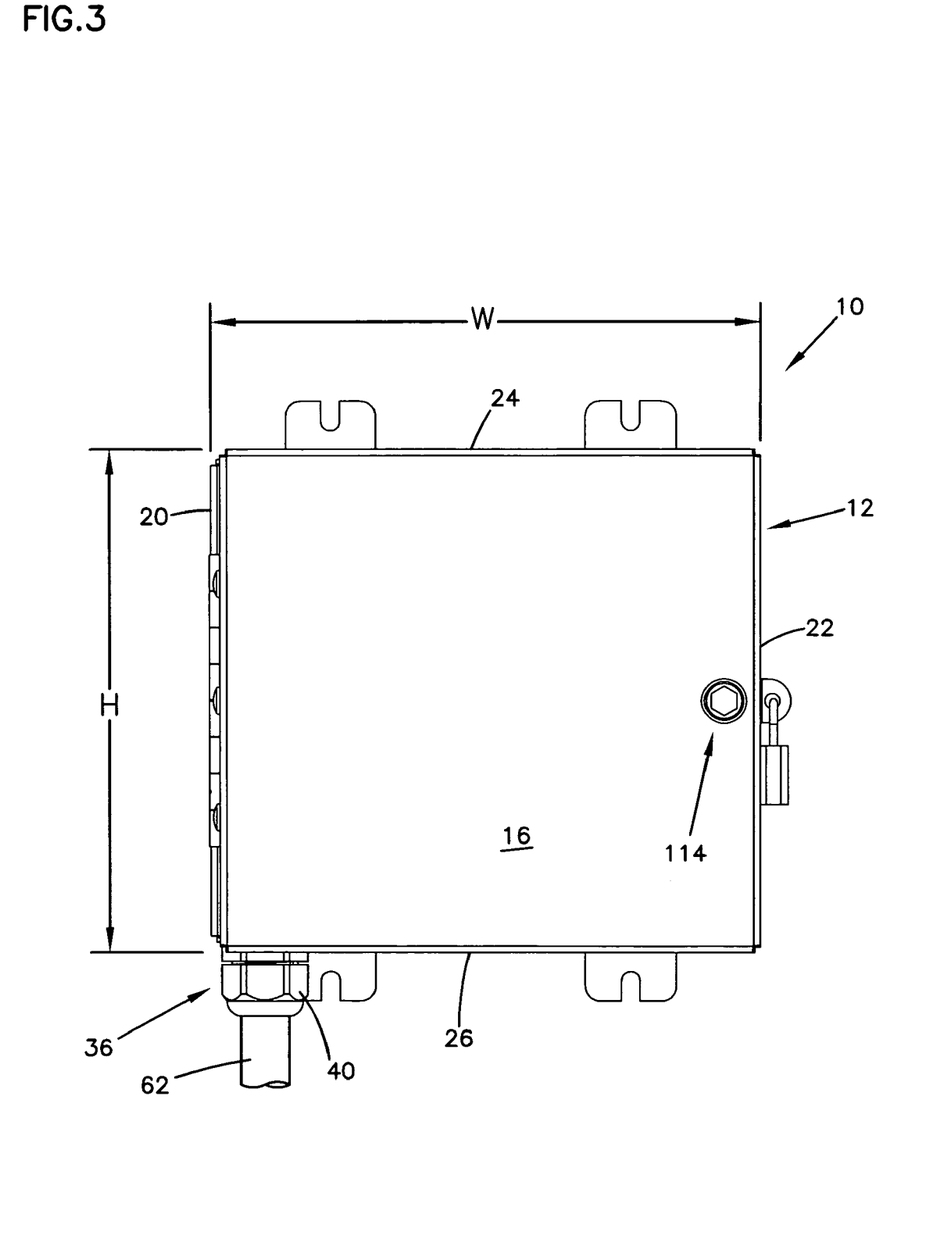
FIG. 3 is a front elevation view of the wall-mount distribution arrangement of FIG. 1.
Figure 4:
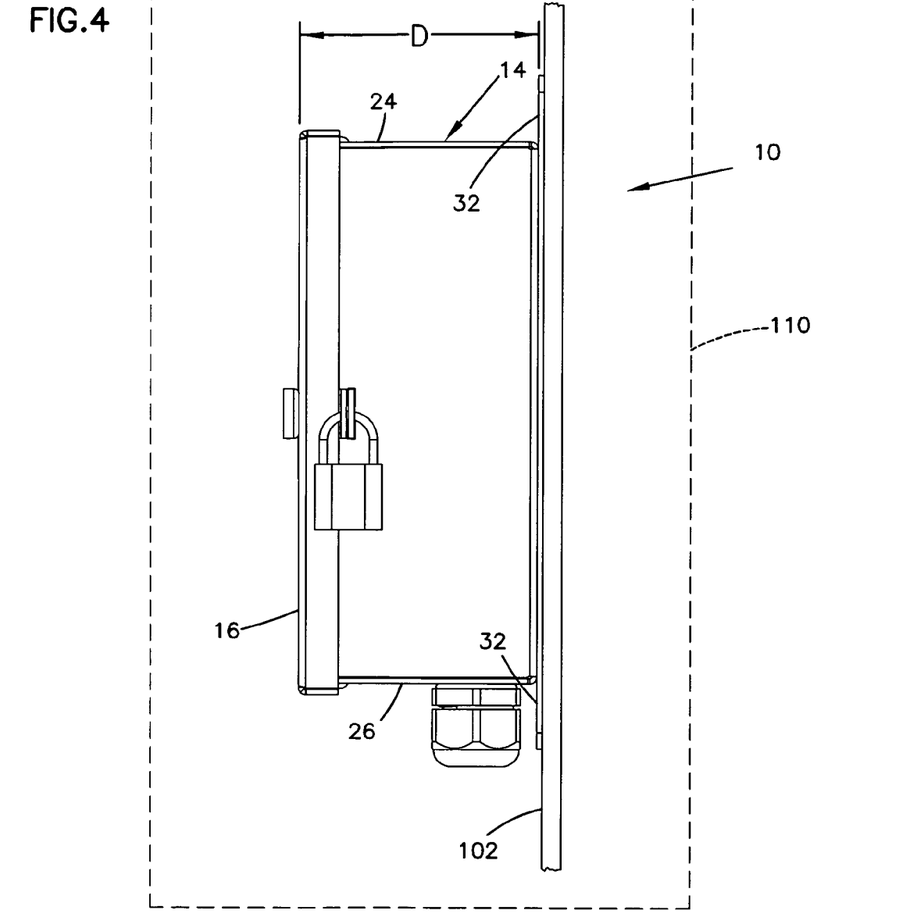
FIG. 4 is a side elevation view of the wall-mount distribution arrangement of FIG. 3.
Figure 5:
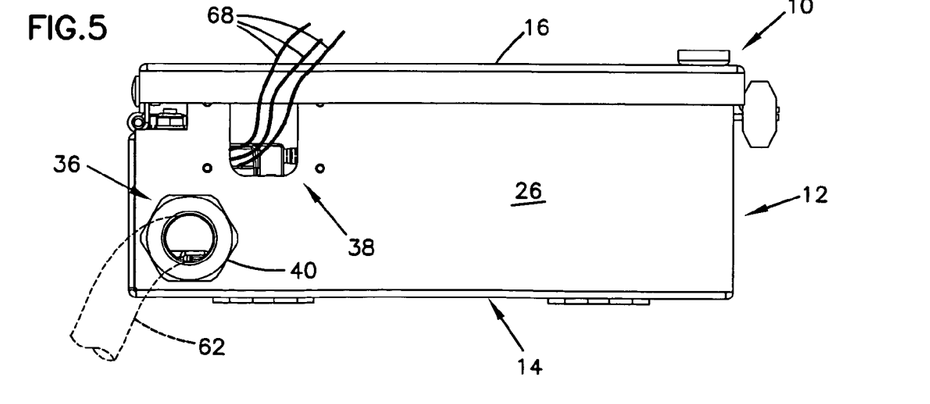
FIG. 5 is a bottom plan view of the wall-mount distribution arrangement of FIG. 3.

Referring now to FIGS. 1-5, the distribution arrangement 10 includes a wall-mount enclosure 12 containing components that provide the interface between an incoming distribution cable 62 (FIG. 2) and a plurality of individual outgoing cables 68 (FIG. 5). The incoming distribution cable 62 is typically a single-fiber cable, however multi-fiber cables can also be used in accordance with the principle disclosed. The individual outgoing cables 68 are typically single-fiber cables that correspond to particular dwellings of a multi-dwelling unit.

Figure 6:
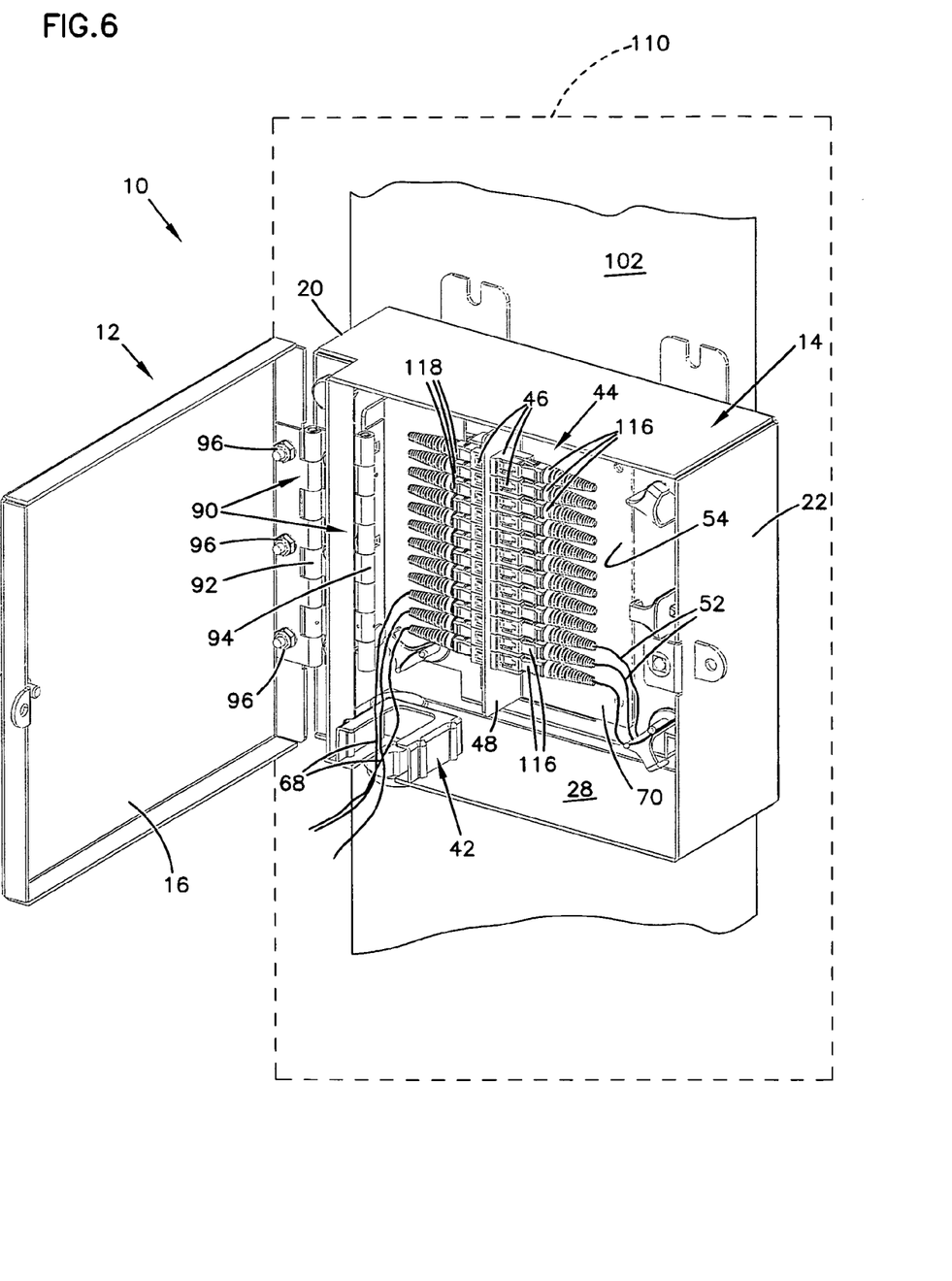
FIG. 6 is a front perspective view of the wall-mount distribution arrangement of FIG. 1, illustrated with a front cover pivoted open.

The wall-mount enclosure 12 of the distribution arrangement 10 generally includes a housing 14 and a front cover 16 pivotally mounted to the housing 14. The housing 14 includes a rear wall 18 (FIG. 2), opposing side walls 20, 22 (FIGS. 1 and 2), a top wall 24, and a bottom wall 26 (FIG. 5). The housing 14 and the cover 16 define an enclosed interior 28 (FIG. 6). A locking mechanism 114 can be provided to lock the enclosure for security and/or safety purposes.

The wall-mount enclosure 12 is sized to mount to a wall of a multi-dwelling unit 110 (schematically represented in FIGS. 4 and 6). The wall-mount enclosure generally has a height H (FIG. 3), a width W, and a depth D (FIG. 4). The height H (FIG. 3) of the wall-mount enclosure 12 is defined between the top wall 24 and the bottom wall 26, and is less than 20 inches. In the illustrated embodiment, the height H of the wall-mount enclosure 12 is less than 10 inches. The width W (FIG. 3) of the wall-mount enclosure 12 is defined between the opposing side walls 20, 22, and is less than 20 inches. In the illustrated embodiment, the width W of the wall-mount enclosure 12 is less than 12 inches. The depth D (FIG. 4) of the wall-mount enclosure 12 is defined between the front cover 16 and the rear wall 18 of the housing 14, and is less than 8 inches. In the illustrated embodiment, the depth D of the wall-mount enclosure 12 is less than 4 inches.

Referring back to FIGS. 1 and 2, the distribution arrangement 10 includes mounting structure 30 configured to mount the distribution arrangement 10 to a vertical wall 102 (FIG. 4) in the multi-dwelling unit 110. In the illustrated embodiment, the mounting structure 30 includes two flanges 32 (FIG. 2) located at the rear wall 18 of the enclosure 12. The flanges 32 having mounting apertures 34 (e.g., slots or holes) sized to receive fastening elements (not shown) that secure the distribution arrangement 10 in relation to the vertical wall 102.

Referring to FIGS. 3 and 5, the wall-mount enclosure 12 defines a cable entry 36 and a cable exit 38. In the illustrated embodiment, the cable entry 36 (e.g., notch, hole or opening) is located in the bottom wall 26 of the enclosure. The incoming distribution cable 62 enters the interior 28 of the wall-mount enclosure 12 through the cable entry 36. Cable protecting elements 40, such as a compression fitting, for example, is secured at the cable entry 26 to prevent damage to the incoming distribution cable 62. The cable exit 38 (e.g., notch, hole, or opening) is also located in the bottom wall 26 of the enclosure 12. The outgoing cables 68 exit the wall-mount enclosure 12 through the cable exit 38. Cable protecting elements 42 (partially shown in FIG. 6), such as foamed grommet, for example, are secured or fitted to the cable exit 38 to prevent damage to outgoing cables 68.

Referring now to FIG. 6, the distribution arrangement 10 includes a termination arrangement 44 located within the interior 28 of the wall-mount enclosure 12. The termination arrangement 44 includes a plurality of fiber optic adapters 46 mounted to a bulkhead or mounting plate 48. In the illustrated embodiment, the mounting plate 48 of the termination arrangement 44 extends in a forward-rearward direction such that the adapters 46 mounted to the plate 48 extend in a lateral side-to-side direction. Connectorized cables (i.e., cables having connectors, for example, 116, 118), including the outgoing cables 68, couple or interconnect to the adapters 46 mounted on the plate 48 (Some connectorized cables represented only by a connector 116, 118 for purposes of illustration clarity.)

The wall-mount enclosure 12 is sized to accommodate only a limited number of service connections for a multi-dwelling unit, as opposed to the mass number of terminations that are provided in large, remote fiber distribution hubs. The limited number of service connections is typically less than fifty. In the illustrated embodiment, the distribution arrangement 10 provides twelve service connections (i.e., provides twelve outgoing single-fiber cables 68).

Figure 7:
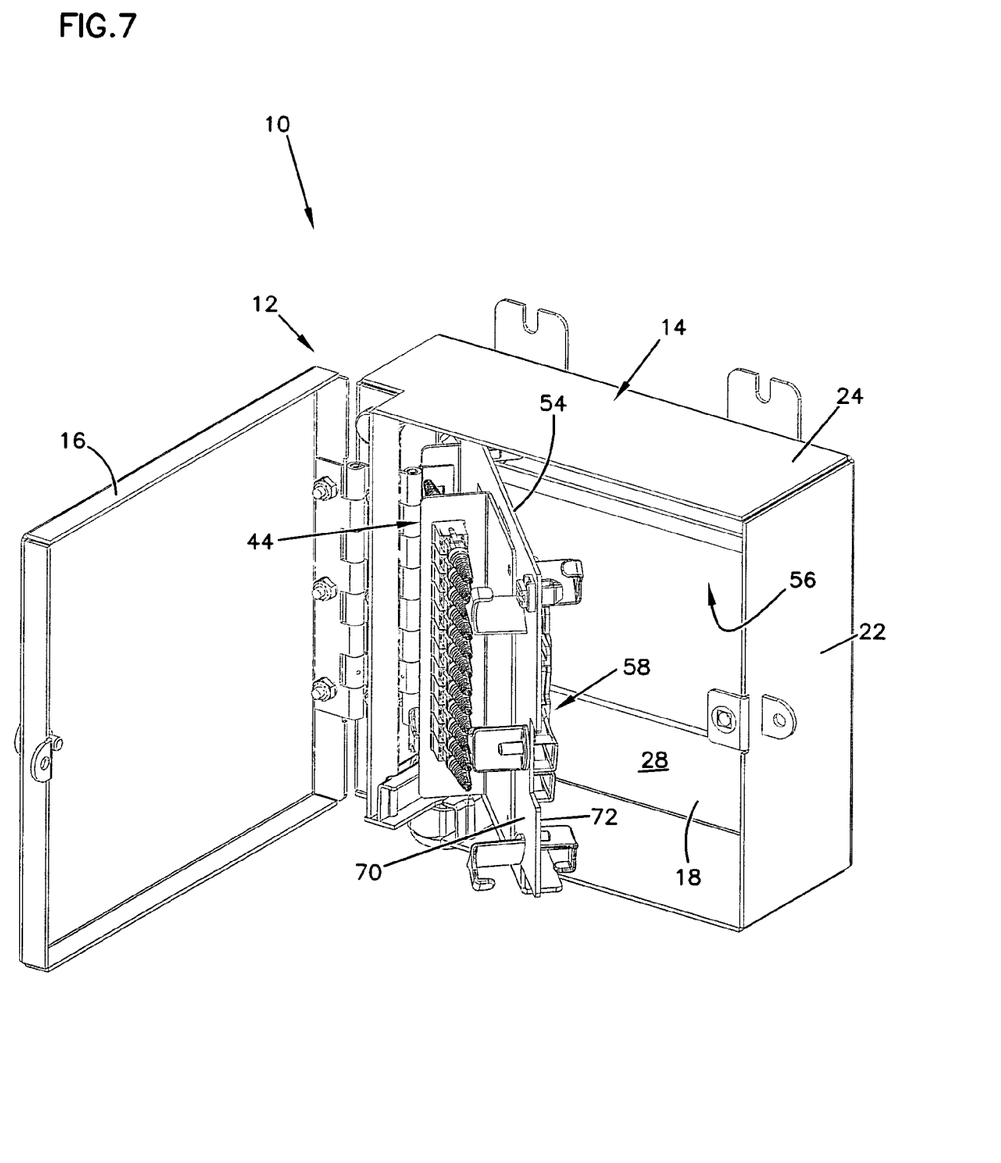
FIG. 7 is a front perspective view of the wall-mount distribution arrangement of FIG. 6, illustrated with a panel pivoted open.
Figure 8:
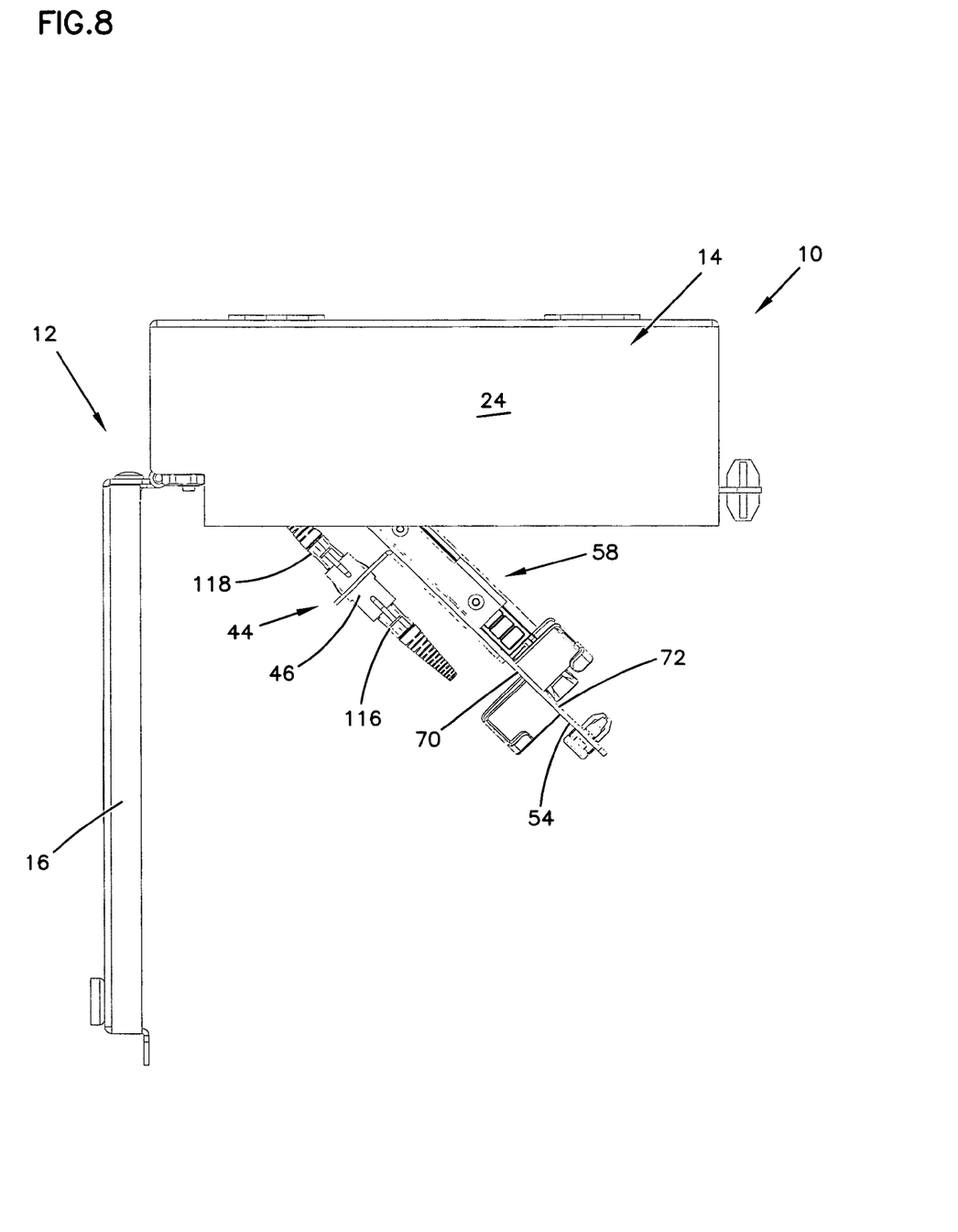
FIG. 8 is a top perspective view of the wall-mount distribution arrangement of FIG. 7.
Figure 9:
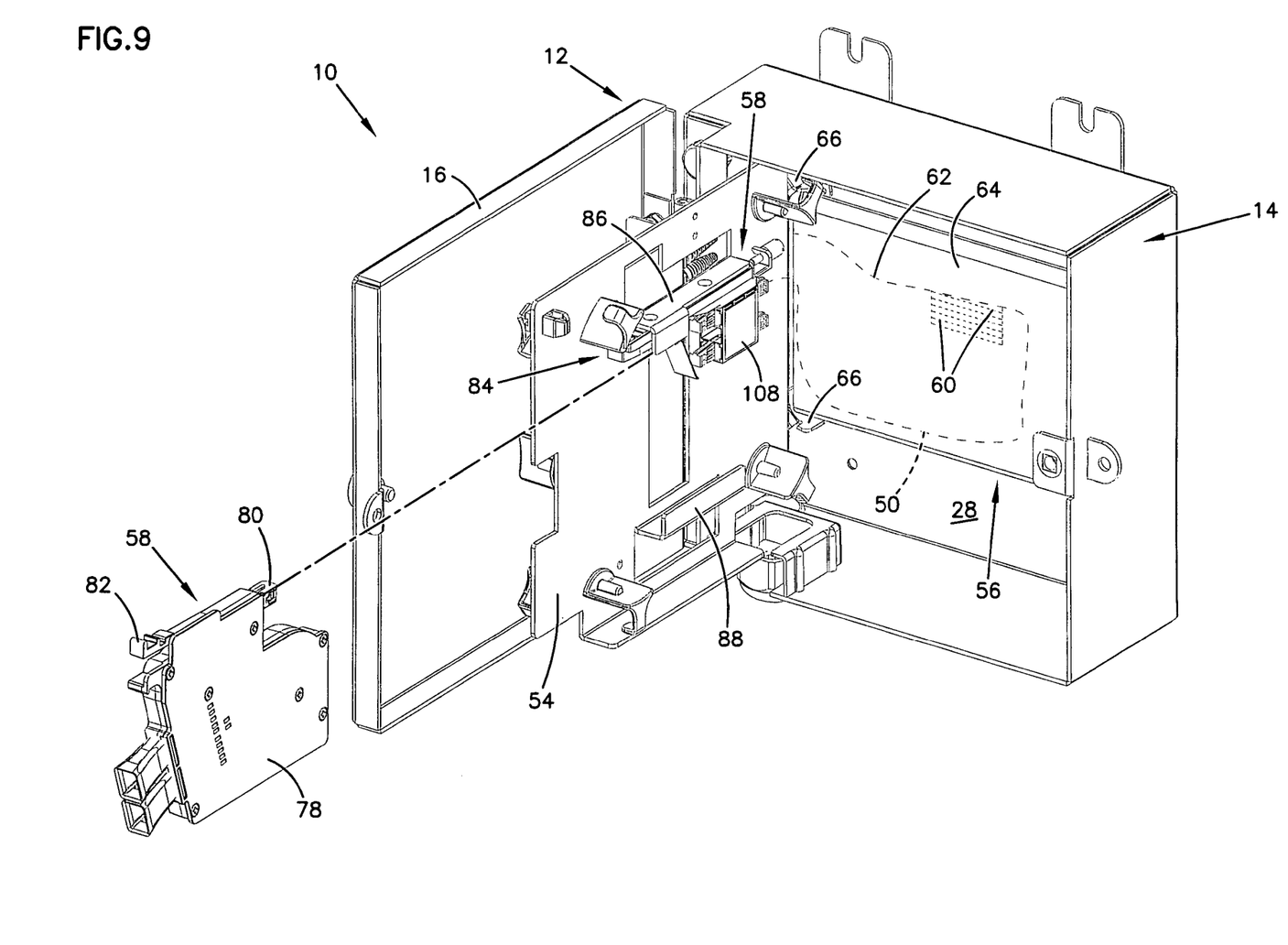
FIG. 9 is a front perspective view of the wall-mount distribution arrangement of FIG. 7, illustrating a mounting feature of a splitter arrangement of the distribution arrangement.

The termination arrangement 44 of the distribution arrangement 10 is mounted to an interior panel 54. The interior panel 54 is a pivoting panel that pivots between a first position (FIG. 6) and a second pivoted position (see e.g., FIGS. 7-8 illustrating the panel 54 only partially pivoted, and FIG. 9 illustrating the panel 54 more fully pivoted). The pivoting panel 54 of the present arrangement 10 is located entirely within the interior 28 of the enclosure 12 when positioned in the first position (FIG. 6). The pivoting interior panel 54 has a forward side 70 and a rearward side 72. In the illustrated embodiment, the termination arrangement 44 is mounted to the forward side 70 of the panel 54.

Referring now to FIG. 7, the distribution arrangement 10 also includes a splicing arrangement 56 and a splitter arrangement 58 located within the interior 28 of the wall-mount enclosure 12. In the illustrated embodiment, the splicing arrangement 56 is mounted to the rear wall 18 of the enclosure 12. The splitter arrangement 58 is mounted to the rearward side 72 of the interior panel 54 (see also FIGS. 10 and 11). Access to both the splicing arrangement 56 and the splitter arrangement 58 is provided by pivoting the panel 54 to the pivoted or open position. Each of the termination arrangement 44 and the splitter arrangement 58 moves with the panel 54 when the panel is pivoted between the first position and the second pivoted position.

Still now to FIG. 9, the splicing arrangement 56 generally includes splices 60 (schematically represented in dashed lines). The splices 60 are contained within a splice tray 64 that is mounted to the rear wall 18 of the enclosure 12. In use, the incoming distribution cable 62 enters through the cable entry 36 and is routed to the splicing arrangement 56. A clamp (not shown) can be used to secure the incoming cable 62 within the interior 28 of the enclosure. Excess distribution cable slack can be wrapped around radius limiters 66 (only some shown) mounted to the rear wall 18 of the enclosure 12 adjacent to the splice tray 64.

At the splicing arrangement 56, the incoming cable 62 is spliced to provide a connectorized cable connection between the splicing arrangement 56 and the splitter arrangement 58. The connectorized cable connection, i.e., the now spliced distribution cable 50, is routed from the splicing arrangement 56 to the splitter arrangement 58 (schematically represented in FIG. 9).

Figure 10:
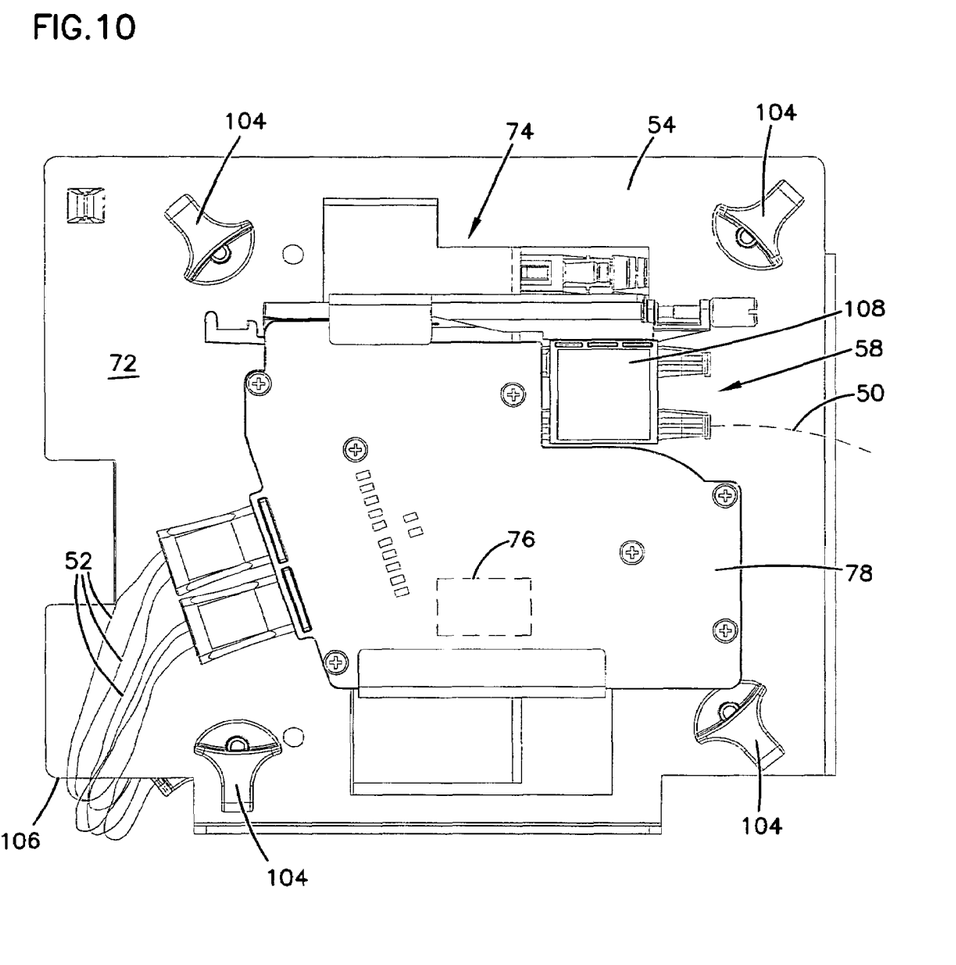
FIG. 10 is a rear elevation view of the panel of the wall-mount distribution arrangement of FIG. 7, shown in isolation.

Referring to FIG. 10, excess spliced cable slack extending between the splicing arrangement 56 and the splitter arrangement 58 can be wrapped around radius limiters 104 mounted on the rearward side 72 of the panel 54. At the splitter arrangement 58, the spliced cable 50 is split into a plurality of split cables 52 that correspond to the plurality of outgoing cable 68.

The splitter arrangement 58 generally include at least one splitter module 74 having a splitter adapter 108 and a cable housing portion 78. A splitter device 76 (schematically represented in dashed lines) is housed within the cable housing portion 78 of the splitter module 74. The spliced cable 50 is connected to the splitter adapter 108. Further details of a splitter module that can be used in the disclosed distribution arrangement 10 are described in U.S. patent application Ser. No. 11/354,297; which application is incorporated herein by reference. Each of the resulting split cables 52 from the splitter module 74 correspond to an individual dwelling, for example. As can be understood, splitting the incoming cable 62 into a number of split cables 52 can provide service to the same number of dwellings.

Figure 11:
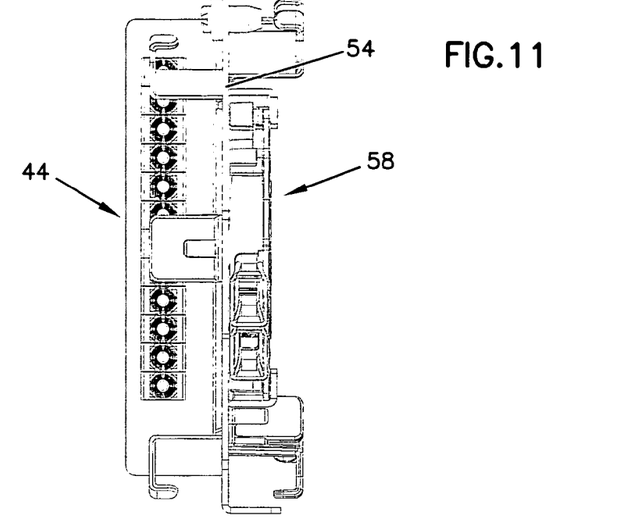
FIG. 11 is a side elevation view of the panel of FIG. 10.
Figure 12:
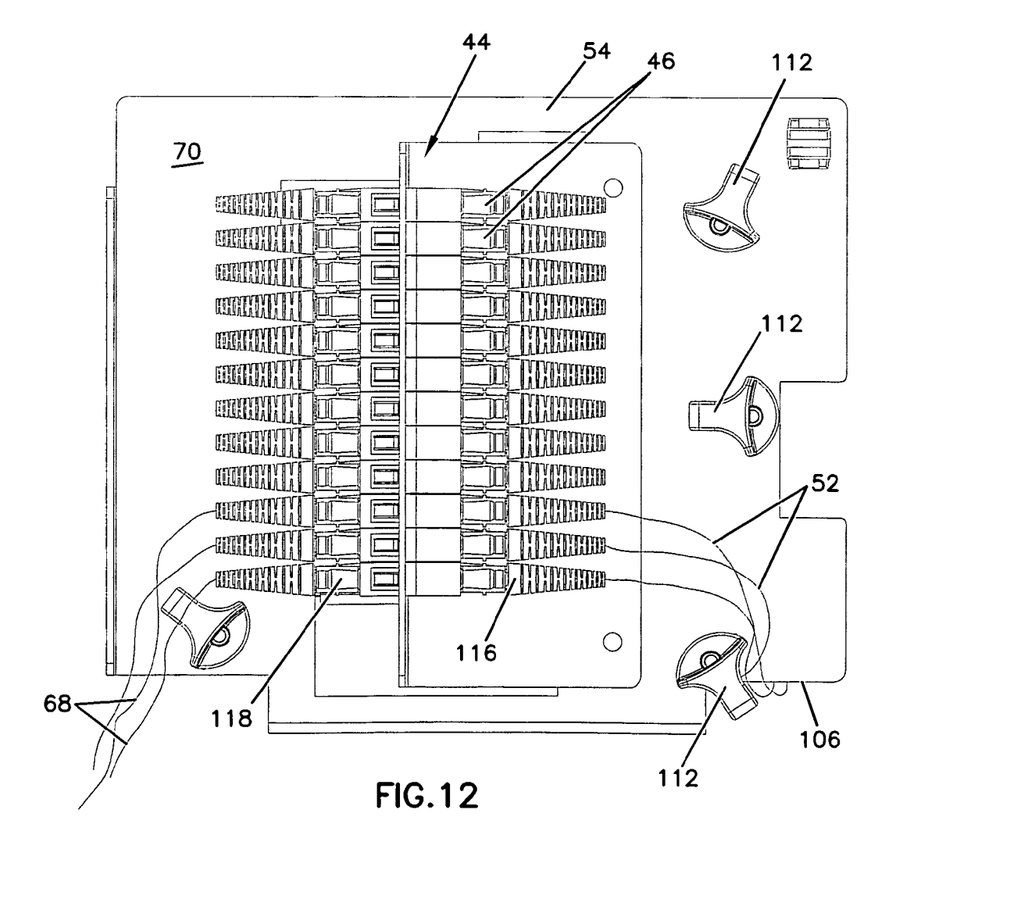
FIG. 12 is a front elevation view of the panel of FIG. 11.

Referring now to FIGS. 10-12, the split cables 52 are routed from the splitter arrangement 58 to the termination arrangement 44. In particular, the split cables 52 are routed from the rearward side 72 of the panel 54 to the frontward side 70 through a notch 106 formed in the panel 54. Excess split cable slack extending between the splitter arrangement 58 and the termination arrangement 44 can be wrapped around radius limiters 112 mounted on the forward side 70 of the panel 54.

In one embodiment, the splitter module 74 of the splitter arrangement 58 is incorporated into the distribution arrangement 10 as a factory-assembled unit so that the user need only plug the splitter module into the enclosure 12 without the need for splicing, for example. In particular, the splitter module 74 can be pre-assembled with the split distribution cables 52 and connectors 116 so that a user need only secure the splitter module 74 to the panel 54, and connect the connectors 116 to the adapters 46 of the termination arrangement 44.

At the termination arrangement 44, each of the split cables 52 is coupled to the one of the adapters 46. The adapters 46 provide an interconnection between one of the split cables 52 and one of the outgoing cables 68. Referring back to FIG. 6, the outgoing cables 68 each exit the wall-mount enclosure 12 through the cable exit 38 and are interconnected and/or routed to the corresponding dwelling of the multi-dwelling unit.

In conventional arrangements, multi-fiber distribution cables are split into multiple cables at a location remote from the distribution location; that is, the interface function of splitting the multi-fiber distribution cable into multiple single-fiber cables is performed remote from the conventional wall-mount enclosure. In the present wall-mount distribution arrangement 10, the splitting function is performed at the distribution location (i.e., at the wall-mount enclosure). Each of the termination arrangement 44, the splicing arrangement 56, and the splitter arrangement 58 is entirely enclosed within the interior 28 of the wall-mount enclosure 12 to provide an arrangement that performs multiple interface functions.

Referring back to FIG. 6, the present wall-mount distribution arrangement 10 is arranged to provide practical and easy access to the components that provide each of the interface functions. For example, the termination arrangement 44 is accessed most often during operation use of the arrangement 10. Accordingly, the termination arrangement 44 is located on the forward side 70 of the interior panel 54 so that the technician need only open the cover 16 of the enclosure 12 to access the multi-dwelling outgoing cable terminations. The distribution cable splicing and distribution cable splitting functions are typically established during installation. Access to the splicing arrangement 56 and the splitter arrangement 58 is needed then only during installation and periodic maintenance or repair. The splicing arrangement 56 and the splitter arrangement 58 are therefore located behind the interior panel 54.

In addition, and with regards to installation and repair, the splitter module 74 of the splitter arrangement 58 is slidably mounted to the panel 54 to more easily accommodate such install and/or repair procedures. In particular, and referring to FIG. 9, the cable housing portion 78 of the splitter module 74 that contains the splitter device 76 and the split cables 52 slides within first and second guides 86, 88 relative to the panel 54 for easy installation and repair of the split cables 52 or device 76. The cable housing portion 78 includes a rear connection 80 that interconnects to the splitter adapter 108 of the module 74. During installation, for example, the cable housing portion 78 slides in a rearward direction within the guides 86, 88 until the rear connection 80 of the cable housing portion connects to the splitter adapter 108.

When the cable housing portion 78 is fully seated within the guides 86, 88, a latch 82 located on the cable housing portion 78 engages corresponding latch structure 84 of the first guide 86 to secure the cable housing portion 78 in relation to the splitter adapter 108. To remove the cable housing portion 78 for repair or replacement, the latch 82 is unlatched from the latch structure 84 of the first guide 86 and the housing portion removed. While the present arrangement 10 illustrates a splitter arrangement 58 having only one splitter module 74, multiple splitter modules 74 can be provided in accordance with the principle disclosed.

Referring back to FIG. 6, the present distribution arrangement 10 includes a hinge arrangement 90 that mounts each of the front cover 16 and the panel 54 to the housing 14. The hinge arrangement 90 includes a first hinge 92 interconnected between the housing 14 and the front cover 16, and a second hinge 94 interconnected between the housing 14 and the panel 54. The hinge arrangement 90 further includes three sets of fasteners (e.g., pins, bolts, screws, rivets) that secure the hinge arrangement 90 to the housing 14 of the wall-mount enclosure 12.

Figure 13:
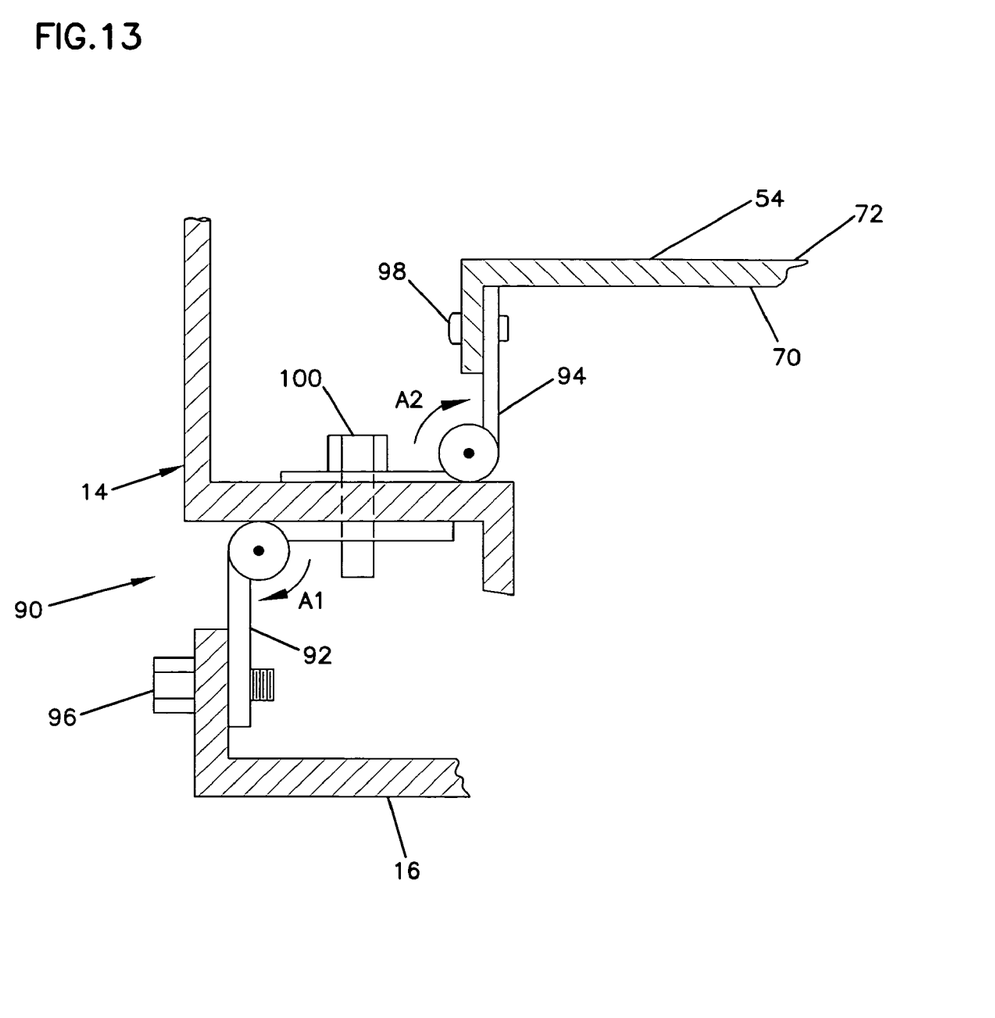
FIG. 13 is a schematic representation of a hinge arrangement of the wall-mount panel of FIG. 6.

In particular, and referring to FIG. 13, the hinge arrangement 90 includes a first set a fasteners 96 (see also FIG. 6) that secures the first hinge 92 to the cover 16. A second set of fasteners 98 secures the second hinge 94 to the panel 54. A third set of fastener 100 secures both of the first hinge 92 and the second hinge 94 in relation to the housing 16. That is, each fastener 100 of the third set of fasteners functions to secure the first hinge 92 and cover 16 to the housing 14, and functions to secure the second hinge 94 and the panel 54 to the housing 14. The present hinge arrangement 90 utilizing a single bolt to secure both first and second hinges 92, 94 not only reduces cost associated with assembly and manufacture, but also more effectively uses space within the interior 28 of the wall-mount enclosure 12.

Referring still to FIG. 13, the first and second hinges 92, 94 of the hinge arrangement 90 each define a vertical pivot axis. The cover 16 swings or pivots from a closed position to an open position in a first direction (i.e., a clockwise direction represented by arrow A1). The panel 54 likewise swings or pivots from the first position to the second pivoted or open position in the same first direction (represented by arrow A2).

The distribution arrangement 10 of the present disclosure includes each of the termination arrangement 44, the splicing arrangement 56, and the splitter arrangement 58 so that all necessary interfacing functions can be performed within the wall-mount enclosure, as opposed to some functions being performed remote from the enclosure. Additional storage regions and/or cable pass-thru regions, other than those illustrated, can also be provided within the wall-mount enclosure.

While reference is made with respect to front, rear, side, and bottom walls, it is to be understood that the particular orientation of the wall-mount arrangement described by referring to a wall as a "rear" wall, for example, is made only for purposes of describing the particular orientation illustrated. As can be understood, in other applications, the wall-mount arrangement can be mounted so that that the rear wall 18 of the enclosure 12 is oriented horizontally to define the bottom of the enclosure, for example.

The above specification provides a complete description of the present invention. Since many embodiments of the invention can be made without departing from the spirit and scope of the invention, certain aspects of the invention reside in the claims hereinafter appended.

What is claimed is:

1. A wall-mount distribution arrangement, comprising:
a) a wall-mount enclosure defining an interior;
b) a panel pivotally mounted within the interior of the wall-mount enclosure, the panel having a forward side and a rearward side, the forward side being accessible when the panel is positioned within the interior of the wall-mount enclosure in a non-pivoted position;
c) a termination arrangement mounted to the forward side of the panel, the termination arrangement including a mounting plate and a plurality of fiber optic adapters mounted to the mounting plate, each fiber optic adapter defining opposite cable termination ends;
d) a splicing arrangement located within the interior of the wall-mount enclosure, the splicing arrangement including fiber optic splices; and
e) a splitter arrangement including a module slidably mounted to the rearward side of the panel, the module including a splitter device that splits an incoming multi-fiber distribution cable into a plurality of outgoing single-fiber cables;

f) wherein both of the opposite cable termination ends of the fiber optic adapters are accessible when the panel is in the non-pivoted position, the splitter arrangement being inaccessible when the panel is in the non-pivoted position, and wherein the splitter arrangement is accessible only by pivoting the panel from the non-pivoted position to a pivoted position.

2. The distribution arrangement of claim 1, wherein the wall-mount enclosure includes a housing and a front cover pivotally mounted to the housing, each of the termination arrangement, the splicing arrangement, and the splitter arrangement being entirely enclosed within the interior of the wall-mount enclosure when the front cover is closed.

3. The distribution arrangement of claim 1, wherein the wall-mount enclosure includes a housing and a front cover, each of the front cover and the panel being pivotally mounted to the housing by a hinge arrangement, the hinge arrangement including:
  i) a first hinge interconnected between the housing and the front cover;
  ii) a second hinge interconnected between housing and the panel; and
  iii) a mounting bolt that secures both of the first hinge and the second hinge in relation to the housing.

4. The distribution arrangement of claim 3, wherein the first hinge and the second hinge each define a vertical pivot axis.

5. The distribution arrangement of claim 1, wherein the wall-mount enclosure defines a cable entry and a cable exit, the wall mount enclosure further including an incoming multi-fiber distribution cable that enters the interior of the wall-mount enclosure through the cable entry.

6. The distribution arrangement of claim 5, further including a plurality of outgoing single-fiber cables that exit the wall-mount enclosure through the cable exit, the plurality of outgoing cables being split cables of the incoming cable.

7. The distribution arrangement of claim 6, wherein the wall-mount enclosure includes a housing and a front cover mounted to the housing, the housing including a top wall, a bottom wall, a rear wall, and opposing side walls.

8. The distribution arrangement of claim 7, wherein the cable entry is formed in the bottom wall of the wall-mount enclosure.

9. The distribution arrangement of claim 8, wherein the cable exit is formed in the bottom wall of the wall-mount enclosure.

10. The distribution arrangement of claim 1, wherein the module of the splitter arrangement includes a rear connection carried by the module, and wherein the splitter arrangement further includes a splitter adapter attached to the rearward side of the panel, the rear connection interconnecting to the splitter adapter when the module is being slidably mounted to the panel.

11. A distribution arrangement, comprising:
  a) a wall-mount enclosure defining an interior, the wall-mount enclosure including a housing and a front cover pivotally mounted to the housing;
  b) a termination arrangement located within the interior of the wall-mount enclosure, the termination arrangement including plurality of fiber optic adapters;
  c) a splicing arrangement located within the interior of the wall-mount enclosure;
  d) a panel pivotally mounted within the interior of the wall-mount enclosure, the termination arrangement being mounted to the panel; and
  e) a hinge arrangement, including:
    i) a first hinge that pivotally mounts the front cover to the housing;
    ii) a second hinge that pivotally mounts the panel to the housing; and
    iii) a mounting bolt that secures both of the first hinge and the second hinge in relation to the housing.

12. The distribution arrangement of claim 11, wherein the first hinge and the second hinge each define a vertical pivot axis.

13. The distribution arrangement of claim 11, wherein the cover swings open in a first direction and the panel swings open in the same first direction.

14. The distribution arrangement of claim 11, further including a splitter arrangement located within the interior of the wall-mount enclosure, the splitter arrangement being mounted to the panel.

15. The distribution arrangement of claim 14, wherein the panel has a forward side and a rearward side, the termination arrangement being mounted to the forward side of the panel, the splitter arrangement being mounted to the rearward side of the panel.

16. The distribution arrangement of claim 14, wherein each of the termination arrangement and the splitter arrangement moves with the panel when the panel is pivoted between a first position and a second pivoted position.

17. The distribution arrangement of claim 14, wherein the splitter arrangement includes at least one splitter module, the splitter module being slidably mounted to the panel.

18. A distribution arrangement, comprising:
  a) a wall-mount enclosure including a housing and a front pivoting cover, the housing including a rear wall, side walls, a top wall, and a bottom wall, the housing and cover defining an enclosed interior;
  b) a hinged panel located within the interior of the wall-mount enclosure, the panel having a forward side and a rearward side, the forward side being accessible when the panel is positioned within the interior of the wall-mount enclosure in a non-pivoted position;
  c) an termination arrangement mounted to the forward side of the hinged panel, the termination arrangement including a plurality of fiber optic adapters, each fiber optic adapter defining opposite cable termination ends; and
  d) a splitter arrangement mounted to the rearward side of the hinged panel, the splitter arrangement including a slidably-mounted module;
  e) wherein both opposite cable termination ends of the fiber optic adapters are accessible when the hinged panel is in the non-pivoted position, and wherein the hinged panel pivots from the non-pivoted position and a pivoted position about a vertical axis to provide access to the splitter arrangement on the rearward side of the hinged panel.

19. The distribution arrangement of claim 18, further including a splicing arrangement mounted to the rear wall of the housing, wherein access to each of the splitter arrangement and the splicing arrangement is provided only when the panel is pivoted from the non-pivoted position.

20. The distribution arrangement of claim 18, wherein the module of the splitter arrangement includes a rear connection carried by the module, and wherein the splitter arrangement further includes a splitter adapter attached to the rearward side of the hinged panel, the rear connection interconnecting to the splitter adapter when the module is being slidably mounted to the panel.

* * * * *